(12) United States Patent
Martinez

(10) Patent No.: US 8,439,375 B2
(45) Date of Patent: May 14, 2013

(54) PORTABLE CLEANER WITH AXLE MOUNT

(75) Inventor: David Martinez, Williamsport, PA (US)

(73) Assignee: Shop Vac Corporation, Williamsport, PA (US)

( * ) Notice: Subject to any disclaimer, the term of this patent is extended or adjusted under 35 U.S.C. 154(b) by 24 days.

(21) Appl. No.: 13/178,231

(22) Filed: Jul. 7, 2011

(65) Prior Publication Data

US 2013/0009371 A1    Jan. 10, 2013

(51) Int. Cl.
*B60B 30/10* (2006.01)

(52) U.S. Cl.
USPC ....... 280/79.5; 280/79.11; 248/129; 248/310; 16/47

(58) Field of Classification Search ................ 180/79.5; 248/129, 310; 280/79.5, 79.11, 32.6; 16/38, 16/47

See application file for complete search history.

(56) References Cited

U.S. PATENT DOCUMENTS

| | | | | |
|---|---|---|---|---|
| 4,749,204 A * | 6/1988 | Raw | ............................. | 280/79.11 |
| 4,799,699 A * | 1/1989 | Berfield et al. | ............... | 280/79.5 |
| 5,313,686 A * | 5/1994 | Berfield | .......................... | 15/323 |
| 5,528,794 A * | 6/1996 | Tomasiak | ......................... | 15/323 |
| 7,942,431 B2 * | 5/2011 | Merdzo | ......................... | 280/79.5 |

* cited by examiner

*Primary Examiner* — J. Allen Shriver, II
*Assistant Examiner* — Brian Cassidy
(74) *Attorney, Agent, or Firm* — Marshall, Gerstein & Borun LLP

(57) ABSTRACT

A new dolly can be used for making either a vacuum cleaner supported by casters or one supported by wheels. Casters can be mounted in sockets in bosses near the dolly perimeter. Alternatively, axle mounts can be fitted over the bosses. Upright walls on the mounts engage corresponding walls on the underside of the dolly, forming spaced supports. An accessory component with molded upright walls is mounted onto the dolly, and its walls engage corresponding walls under the dolly. One fastener seats against one fastener surface on the accessory component, and extends into a hole in that fastener surface, an aligned opening in the corresponding axle mount, and into the dolly.

11 Claims, 11 Drawing Sheets

PORTABLE CLEANER WITH AXLE MOUNT

CROSS-REFERENCE TO RELATED APPLICATIONS

Not applicable.

BACKGROUND OF THE INVENTION

The present invention relates generally to portable cleaning devices, and more particularly to the manufacture of cleaners such as vacuum cleaners that are supported by dollies.

Dollies for cleaners such as vacuum cleaners often use wheels, casters, or wheel/caster combinations to support the cleaner for movement across a floor. Swivel casters permit movement in multiple directions, and a cleaner supported solely by swivel casters can easily be pivoted by a user or moved in any direction. On the other hand, providing one or two wheels on a fixed axle assists a user in moving the cleaning product in a straight line.

Providing purchasers with an option to purchase a product with either all casters or with a combination of casters and wheels would be commercially beneficial. However, manufacturing separate dollies for each option can be unduly expensive.

BRIEF SUMMARY

The applicants have developed a new product that enables a manufacturer to expand the use of a single dolly to two different products: one supported solely by casters, and the other supported by all wheels or by a combination of wheels and casters.

Like prior known devices, the new portable cleaner device has a dolly with caster sockets that are arranged generally vertically, are positioned in bosses near the perimeter of the dolly, and are accessible from an underside of the dolly. The new cleaner also has a wheel that is mounted on an axle hub and supports the cleaner for movement across a floor. Unlike in prior known devices, however, the axle hub is provided on a separate axle mount that engages the boss and mounts to the dolly.

Like some prior products, the new cleaning product preferably has four caster sockets that are positioned at each outer corner of the dolly. It has swivel casters mounted in two of the caster sockets on one side of the dolly, and like some other prior products, it has two wheels mounted opposite the casters. Unlike in prior known products, these two wheels can be mounted on co-linear axle hubs on two separate axle mounts, one connected to each of the two open caster sockets.

For ease of manufacturing and durability in use, the axle mounts can be made of molded plastic, and can be secured to the dolly by fasteners that are accessible only from the underside of the dolly.

To ensure a good connection, a sleeve can be provided on each axle mount to receive one of the bosses for the caster sockets. Preferably, the mount can be also be supported against the dolly by upright walls that extend outwardly from near the sleeve in a direction away from the axle hub. These walls engage corresponding walls on the underside of the dolly, forming a first spaced support.

A second spaced support can also be integrally mounted on each axle mount, with upright walls that extend outwardly from near the sleeve in a direction away from the axle hub and the first spaced support. These walls can also engage corresponding walls on the underside of the dolly, and help support the axle mount against the dolly.

The new product also accommodates an accessory component that has molded upright walls that engage corresponding walls on the underside of the dolly. One fastener seats against one fastener surface on the accessory component, and extends through a hole in that fastener surface, an aligned opening in the corresponding axle mount, and into the dolly. Another fastener seats against another fastener surface on the accessory component, extends through a hole in that fastener surface, an aligned opening in the corresponding axle mount, and into the dolly.

BRIEF DESCRIPTION OF THE DRAWINGS

The invention may be better understood by referring to the accompanying drawings, in which.

DETAILED DESCRIPTION

Figure 1:
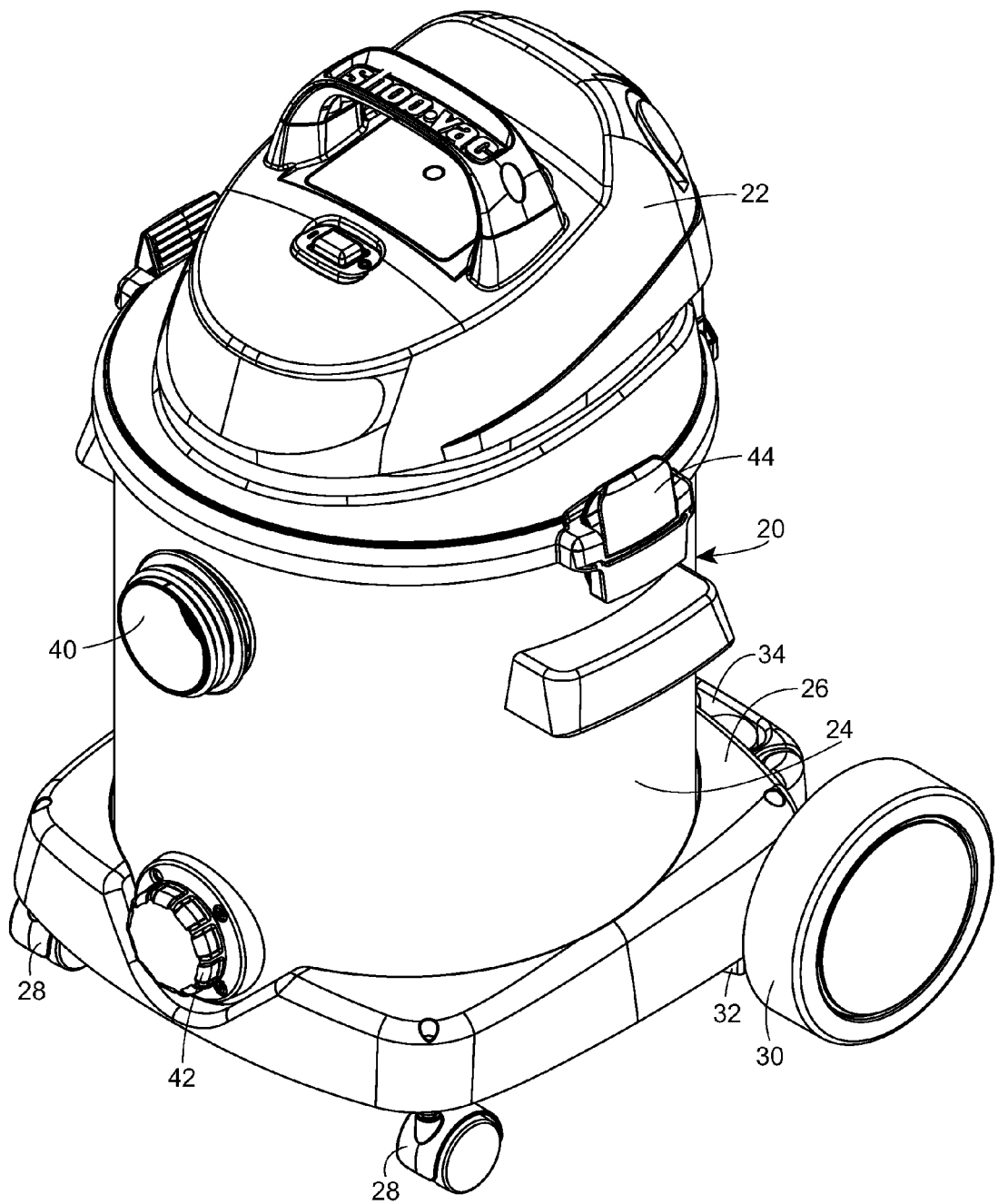
FIG. 1 is perspective view of one example of a vacuum cleaner that uses the invention.
Figure 2:
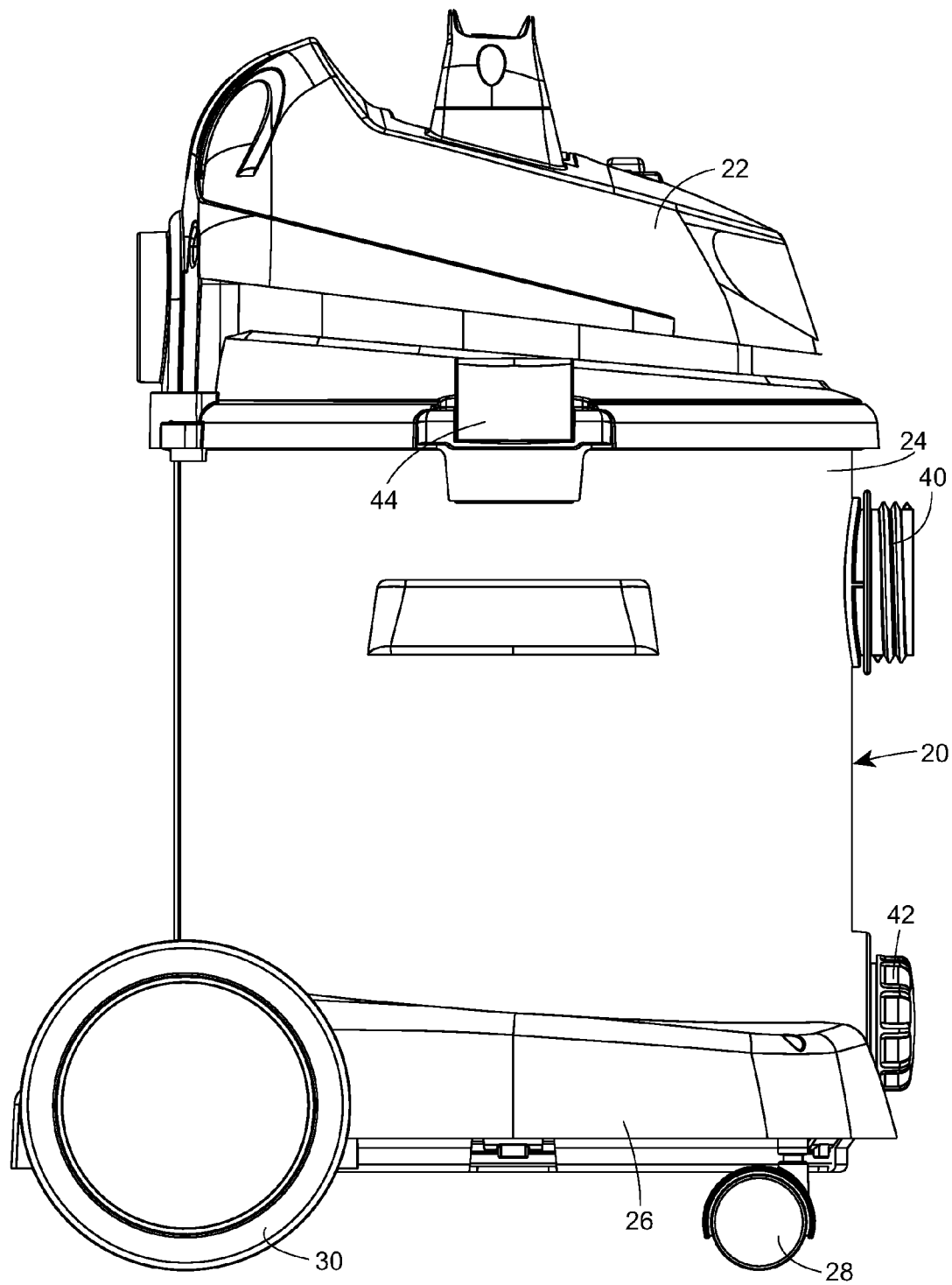
FIGS. 2-4 are front and side elevations of the vacuum cleaner.

FIGS. 1-6 show a portable vacuum cleaner 20 that illustrates the invention. The general components of the illustrated vacuum cleaner are a power head 22, a tank 24, a dolly 26, casters 28, wheels 30, axle mounts 32, and an accessory component 34. Each component will be discussed in turn.

The Power Head

The power head 22 that is illustrated is a conventional vacuum cleaner head. It includes an electrically powered vacuum source such as an air impeller. An air filter can be mounted to a filter cage that extends downwardly from the vacuum head. Other internal structure, such as a float to prevent liquid from entering electrically circuitry, can be provided in power heads used for wet/dry vacuums.

Typically, such power heads operated in the range of 0.5 peak horsepower to 6.5 peak horsepower. However, a rating from 0.2 peak horsepower to 12 peak horsepower would not be extraordinary.

The Tank

The tank 24 that is illustrated is an upright, cylindrical tank that holds the dirt, debris or liquid collected by the portable vacuum cleaner 20. Although other arrangements can be used, the illustrated tank has an inlet 40 near the top and an optional drain 42 near the bottom. The inlet is a conventional one, and provides a location where a flexible vacuum hose can be attached to the tank. As is well known in the art, such a hose can be directed by a user to the dirt or debris to be cleaned. The drain is also a conventional one, and enables user to easily drain liquid from the tank.

Typically, such tanks have a nominal capacity of 1½ to 20 gallons. A capacity from 1 gallon to 65 gallons would not be extraordinary.

Conventional latches 44 can be used to releasably secure the power head 22 to the tank 24.

The Dolly

The dolly 26 supports the tank 24 and forms a base for the casters 28 and the wheels 30. The illustrated dolly is made of molded plastic, though it could also be made of other materials.

Figure 7:
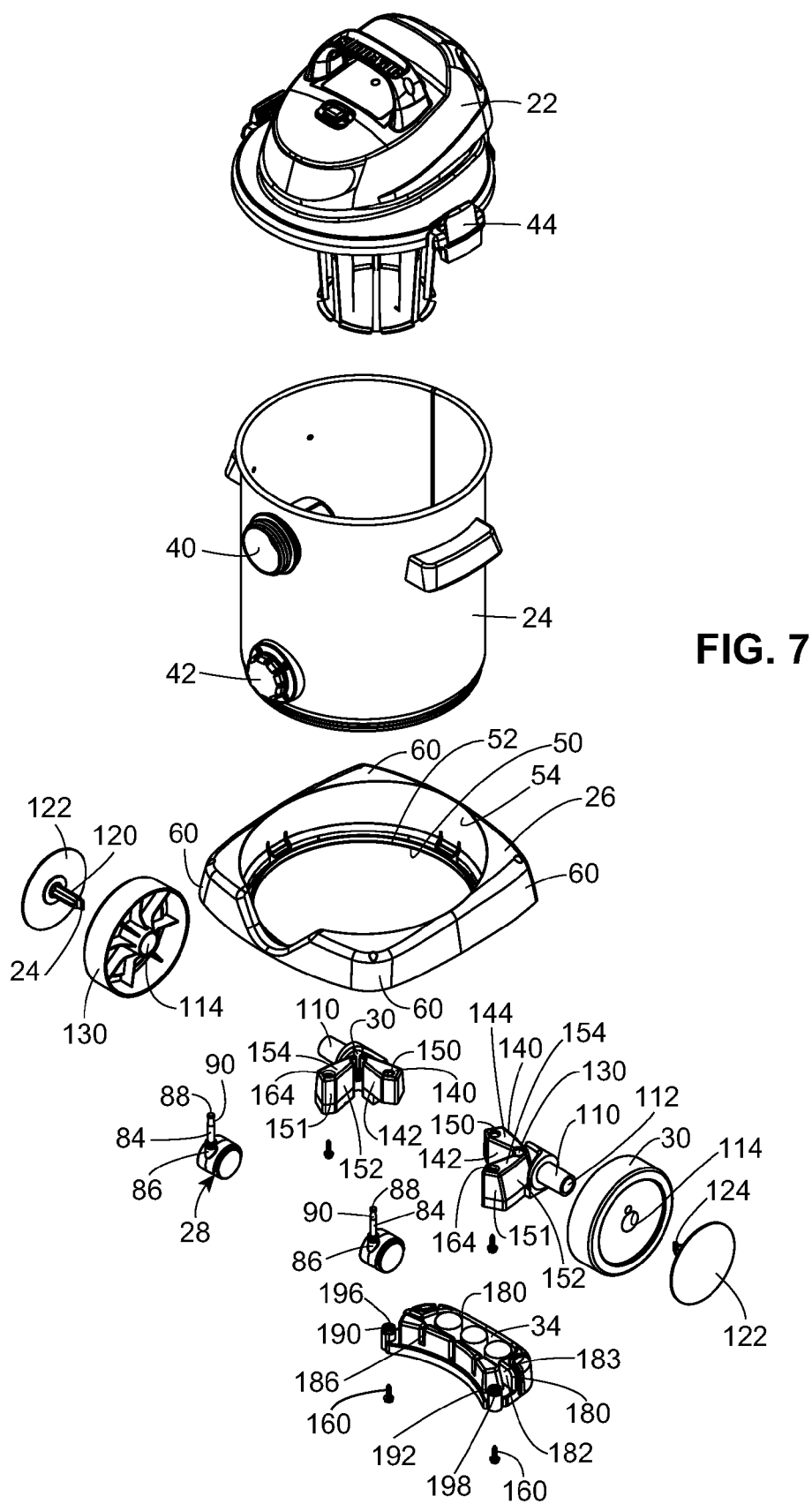
FIG. 7 is an exploded perspective view of the lower parts of the vacuum cleaner.

As seen in FIG. 7, the illustrated dolly 26 has an open center 50 bounded by a lower rim 52 that supports the bottom of the tank 24. The tank is laterally restrained in the dolly by an upward dolly wall 54 that rises from the lower rim. In this example, the dolly wall is several inches high, and generally surrounds the tank. Other arrangements can also be used.

To form a suitable base for the casters 28 and the wheels 30, the illustrated dolly 26 is generally rectangular in profile, having four rounded corners 60. Other configurations, such as a triangular configuration, could also be useful. As see in FIG. 8, each corner of the dolly has a boss 62 near the perimeter of the dolly. These bosses have downward-opening apertures 64 that are accessible from the underside of the dolly, and lead or form part of caster sockets 70 (best seen in FIG. 9) that are arranged generally vertically within the dolly. The caster sockets can be integrally formed in the base or take the form of commercial socket inserts that are mounted within the apertures.

The caster sockets 70 in the illustrated dolly 26 have a conventional arrangement for holding a stem on a caster. Many types of caster sockets are commercially available and can be used, and many include a structure that engages a stem on a caster in a way that retains the caster in the socket. For example, some caster sockets have crimped, slotted walls that lead to an upper end. The walls deflect outwardly to permit the upper end of a caster stem to pass upwardly within the walls, but then spring closed and lock into a radial slot on the caster stem when the stem is fully inserted, preventing the stem from being easily withdrawn.

Figure 9:
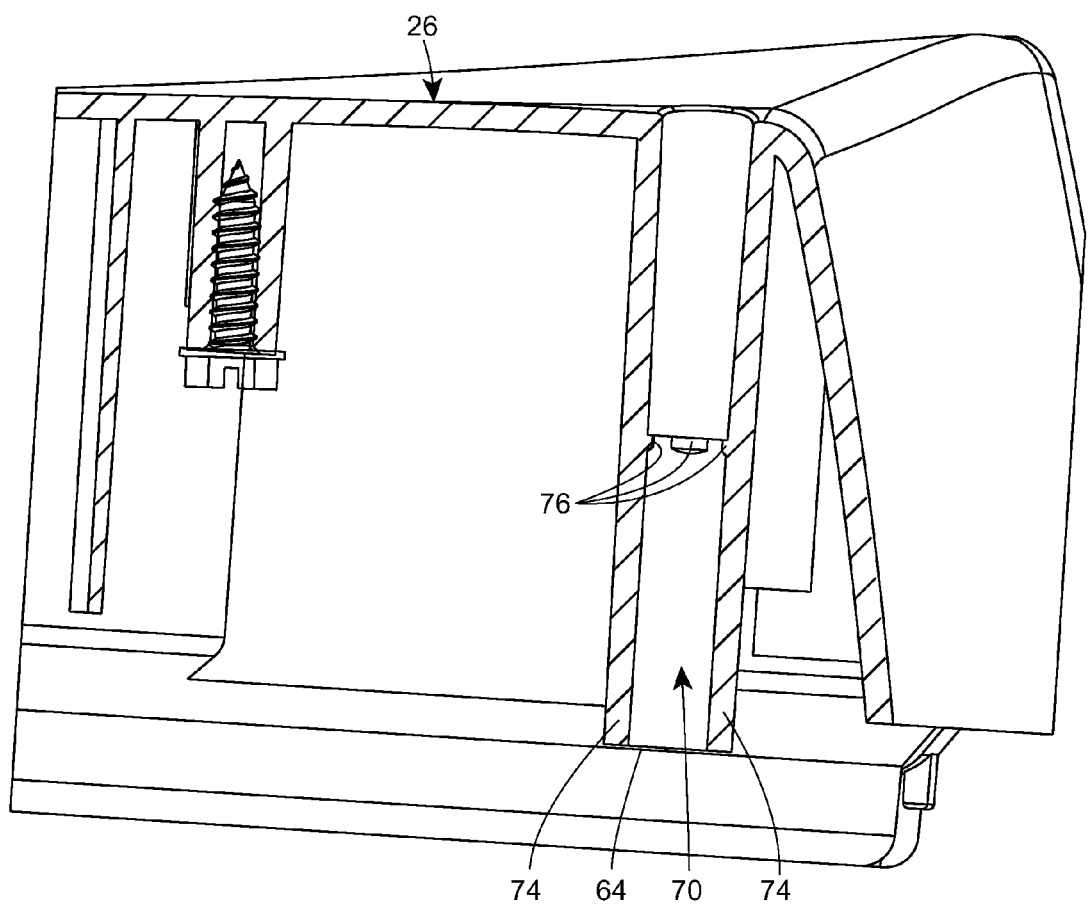
FIG. 9 is a cross-sectional view of the part of the dolly identified as 9-9 in FIG. 8.

As seen in FIG. 9, the socket 70 in the illustrated dolly 26 has relatively narrow plastic walls 74 with internal projections 76. How this particular structure locks onto the caster will be described in the next section. What is more important is that the structure does in fact accommodate and lock onto the casters used with this dolly, and this fact can be established by inserting one of the casters 28 into one of these apertures 64 and checking if the caster is retained in place.

The Casters

Figure 3:
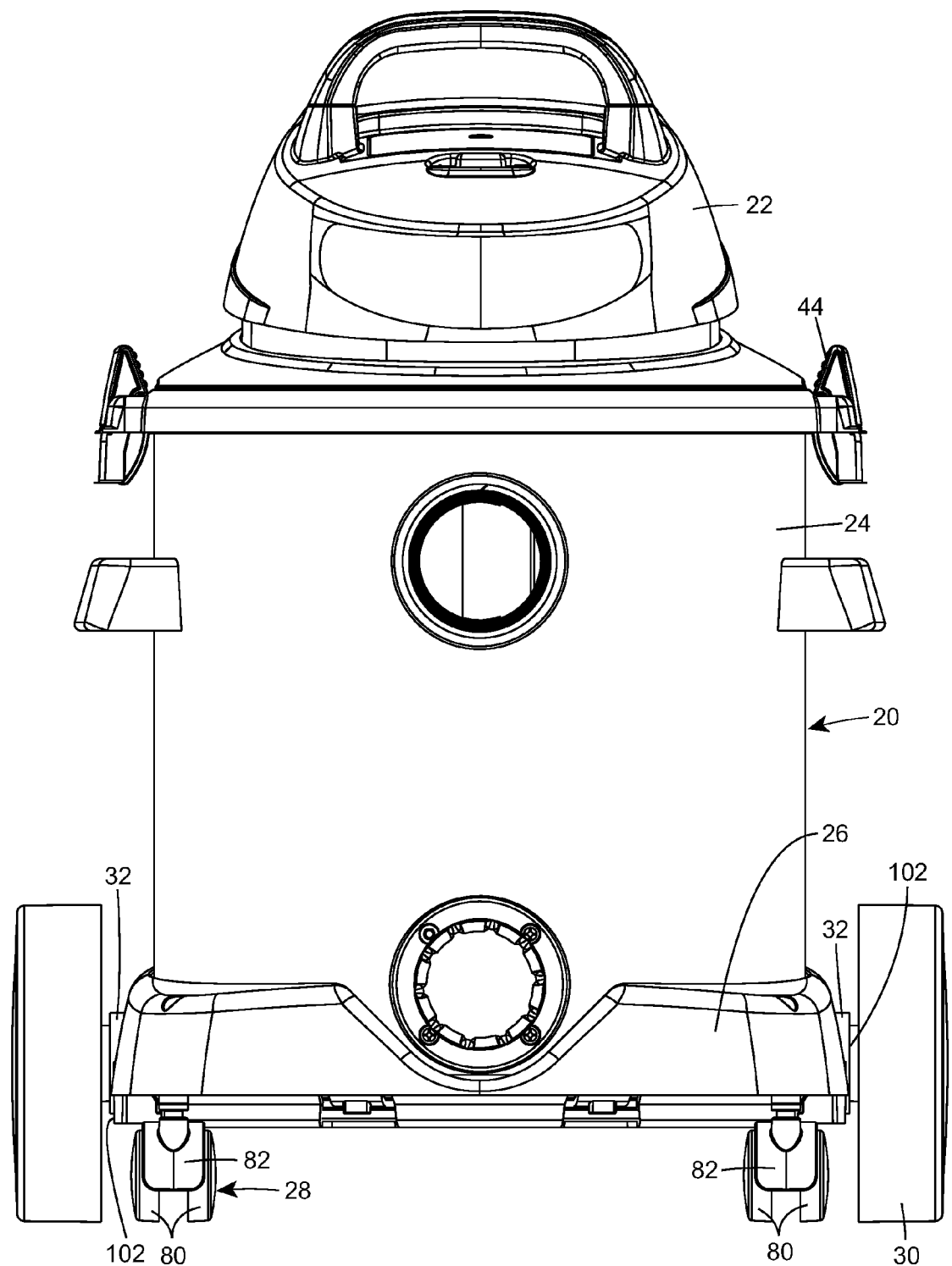
Figure 4:
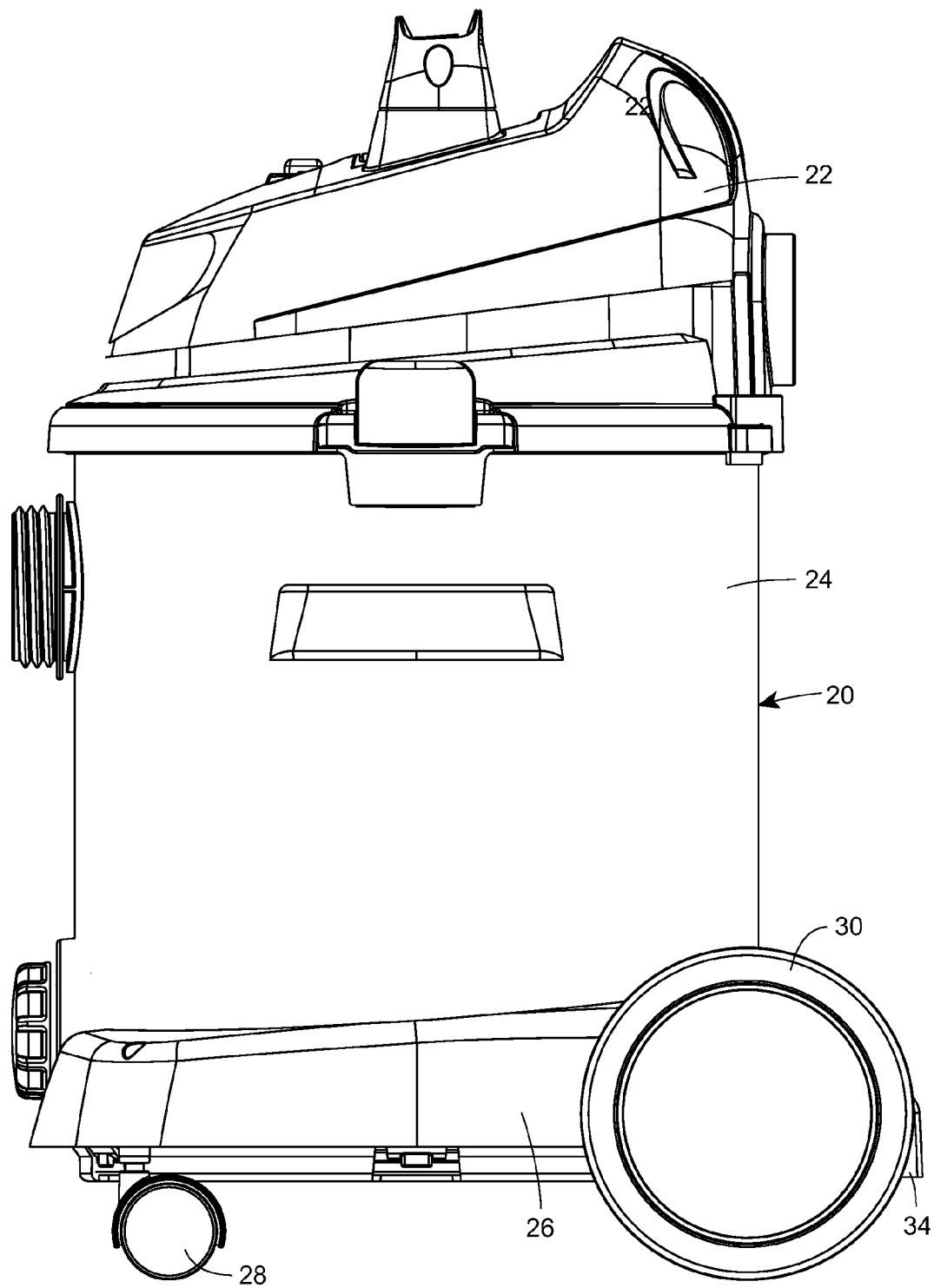

The casters 28 (FIG. 1-6) support the vacuum cleaner 20 for movement across a floor. The illustrated casters are swivel casters, and are mounted in two of the caster sockets 70 on the front side of the dolly 26. Any of a variety of conventional casters can be used. As seen in FIG. 3, each of the illustrated casters has a double wheel 80 mounted to a rig 82. As seen in FIG. 7, a stem 84 extends upwardly from an off-center fork base 86. The stem has a resilient grip ring 88 at its upper end, which extends radially outwardly beyond a locking neck 90.

Each of the illustrated casters 28 is mounted in one of the casket sockets 70 by inserting the stem 84 of the caster into the aperture 64 (FIG. 8) until the grip ring 88 passes the internal projections 76 on the caster socket 70. The internal projections then lock into the locking neck 90 on the stem, trapping the caster in place with the fork base 86 near or adjacent the lower surface of the corresponding boss 62 on the underside of the dolly 26.

During assembly of the vacuum cleaner 20, two additional casters could be installed in the remaining two caster sockets 70 on the back side of the illustrated dolly 26 to provide a dolly that is supported by four casters. In the illustrated product 20, however, that is not done.

The Wheels

As seen in FIGS. 1-7, the back side of the illustrated vacuum cleaner 20 is instead supported by wheels. The illustrated wheels 30 have a much larger diameter than the casters 28, and roll on a plane that lies outside the lateral edges 102 (FIGS. 3 and 5) of the dolly 26. Generally, the wheels can be made of any suitable material, including molded plastic.

In the illustrated vacuum cleaner 20, the wheels are mounted on hubs 110, seen in FIG. 7. Each illustrated hub 110 has a central bore 112 that is accessible from the outer side of the hub. The illustrated wheel has a through opening 114 that fits onto the hub. After the wheel is placed on the hub, a locking arm 120 on a hubcap 122 is inserted through the through opening in the wheel and into the central bore in the hub. There, a tang 124 on the locking arm locks onto mating structure in the central bore, trapping the wheel between the hub and the hubcap, while allowing the wheel to rotate about the hub.

The Axle Mounts

Figure 11:
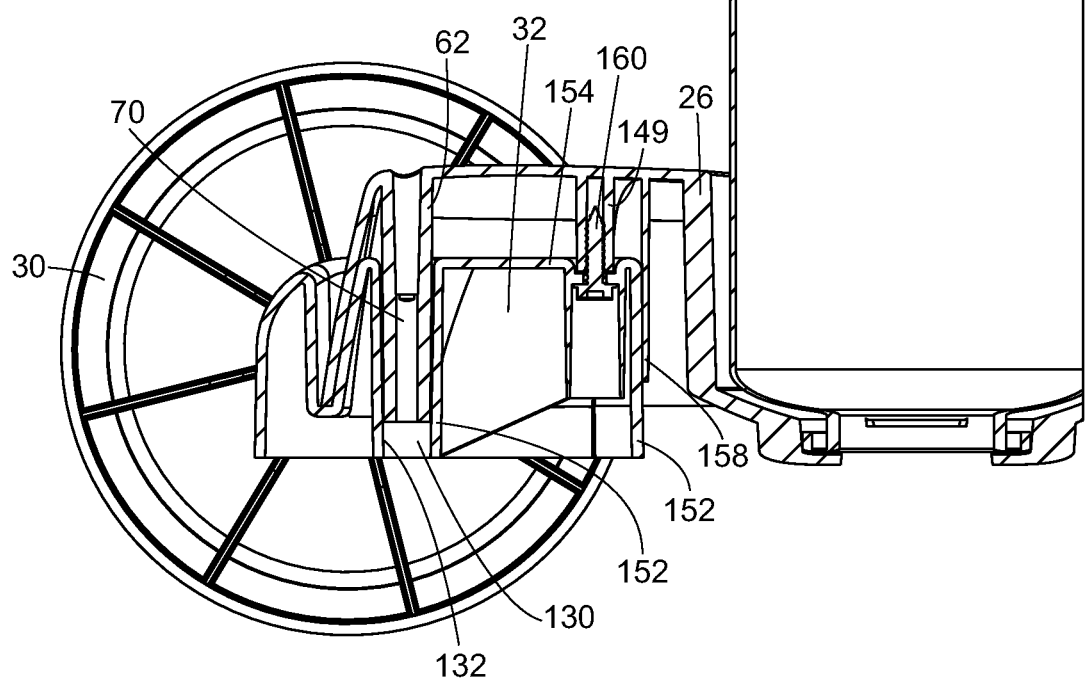
FIG. 11 is a cross-sectional view of the parts of the vacuum cleaner identified as 11-11 in FIG. 6.

Instead of being integrally formed with the dolly 26, the hubs 110 are part of the axle mounts 32. The axle mounts are specially adapted to mount to the underside of the dolly using the bosses 62 that are associated with the unfilled caster sockets 70. As seen in FIG. 11, each of the axle mounts has a sleeve 130 that receives one of the bosses 62. In the illustrated vacuum cleaner 20, the bosses are circular in profile and the sleeve in each axle mount has one or more corresponding inward-facing walls 132 that spans more than ¾ of the periphery of the bottom edge of the boss. In the illustrated example, upper portions of the walls are slotted and taper radially outwardly.

Each of the illustrated axle mounts 32 is made of molded plastic and, as best seen in FIG. 7, has two spaced supports that are integrally molded with the axle mount and to help provide a solid engagement with the dolly 26.

The first spaced support 140 has upright walls 142 that extend outwardly from near the sleeve 130 in a direction away from the axle hub 110. A lateral web 144 joins these two walls. As partially seen in FIG. 10, the illustrated walls and part of an upper surface on the web all at least partially fit against and engage corresponding walls and faces 148 and on the underside of the dolly 26, helping to support the axle mount against the dolly. Here, the dolly has a screw boss 149 that projects into an opening 150 in the lateral web.

The other spaced support 151 has upright walls 152 that also extend outwardly from near the sleeve 130, but in a direction away from the axle hub 110 and the first spaced support 140. A second lateral web 154 joins these two walls and, with the walls, at least partially fits against and engages corresponding walls and faces 158 on the underside of the dolly 26 (partially seen in FIG. 11), helping to further support the axle mount 32 against the dolly.

Figure 8:
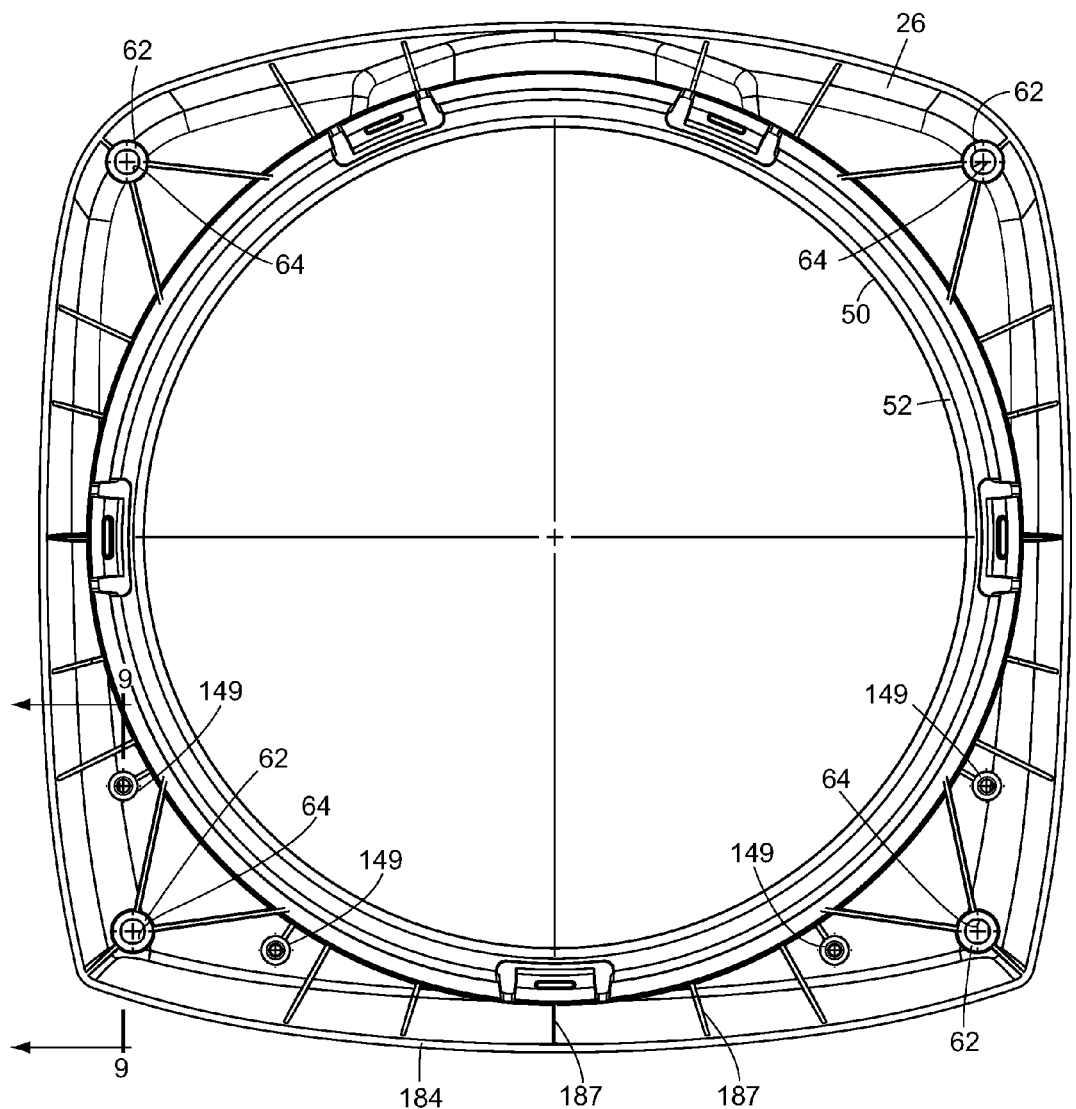
FIG. 8 is a bottom view of the dolly.

The axle mounts 32 are secured to the dolly 26 by fasteners 160 (FIGS. 10 and 11) that are accessible only from the underside of the dolly. This arrangement may help to prevent inadvertent loosening of the fasteners. In the illustrated vacuum cleaner 20, the fasteners are screws. As seen in FIG. 11, one of the screws passes through an opening 164 in the web 154 (FIG. 7) and into one of the screw bosses 149 on the underside of the dolly 26 (FIG. 8). Preferably, the axle mounts are secured to the dolly in arrangements in which the axle hubs 110 are collinear, causing the wheels 30 to be parallel.

In the illustrated vacuum cleaner 20, the two axle mounts 32 are mirror images of each other. With slight modification, it would also be possible to arrange the axle mounts and the dolly 26 so that the same axle mount could be used on either side of the dolly, and still provide parallel wheels.

The Accessory Component

Figure 5:
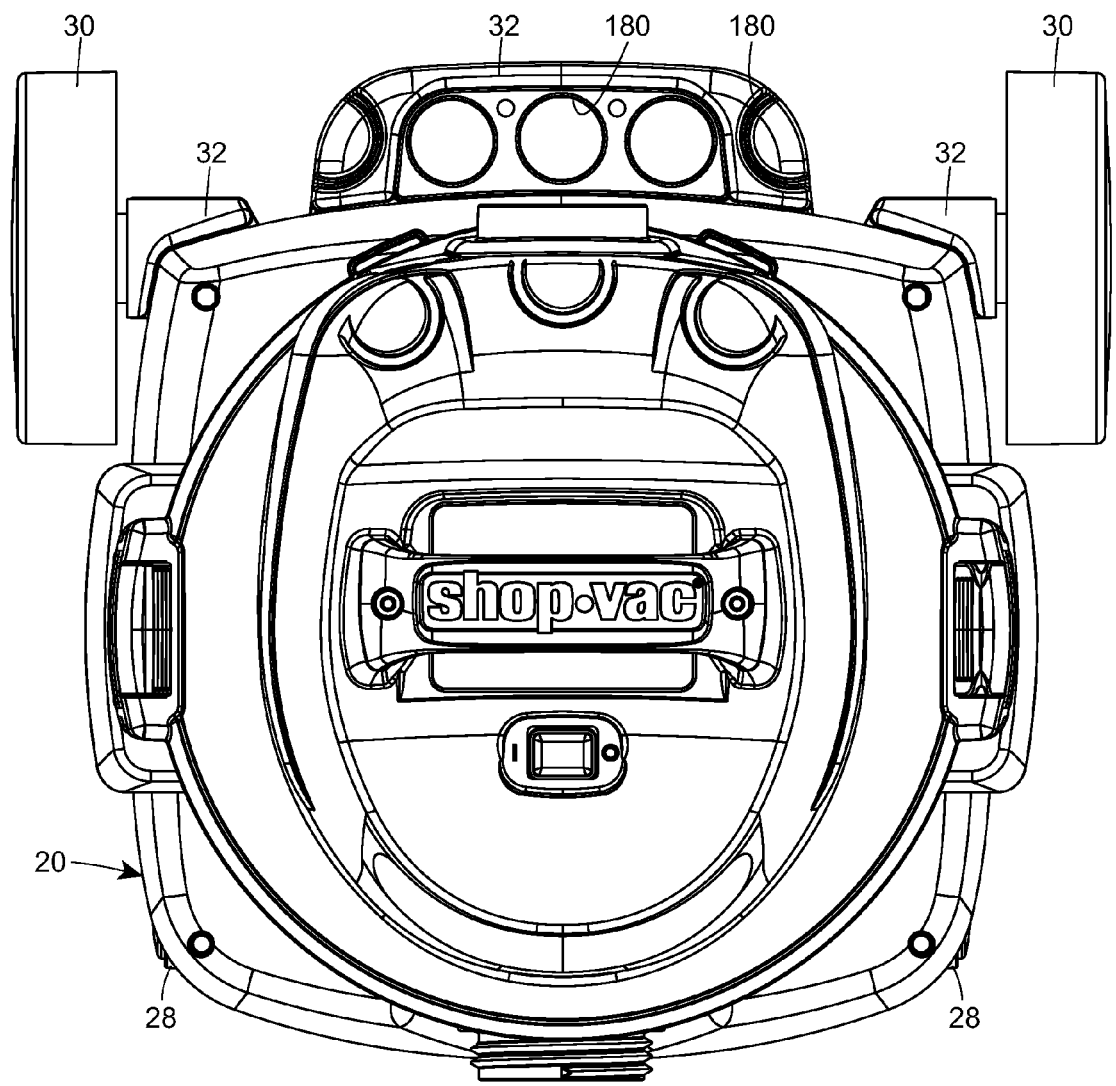
FIGS. 5 and 6 are top and bottom views of the vacuum cleaner.
Figure 6:
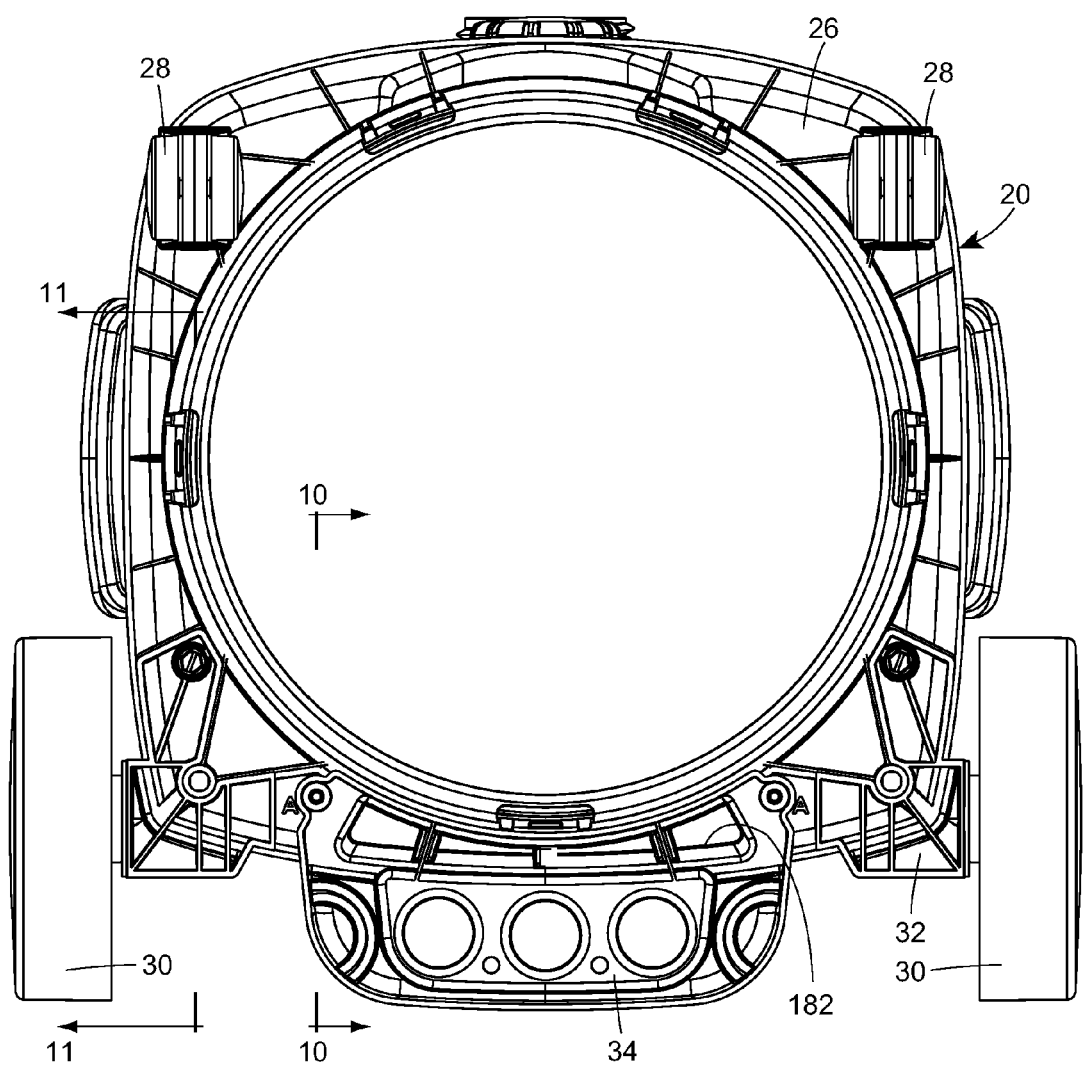
Figure 10:
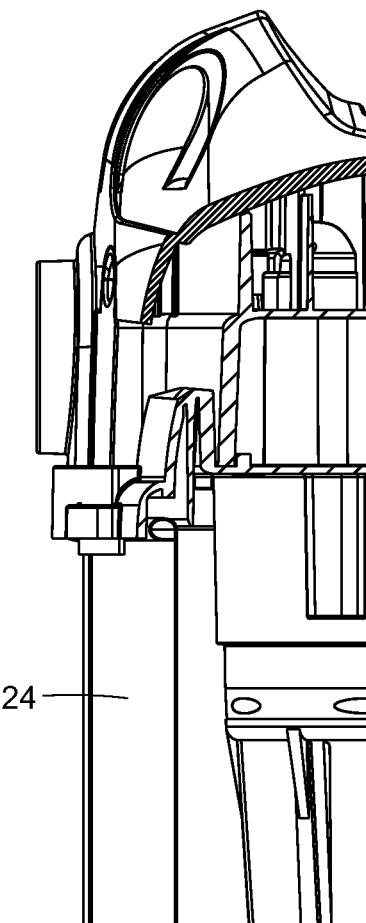
FIG. 10 is a cross-sectional view of the parts of the vacuum cleaner identified as 10-10 in FIG. 6.
Figure 10:
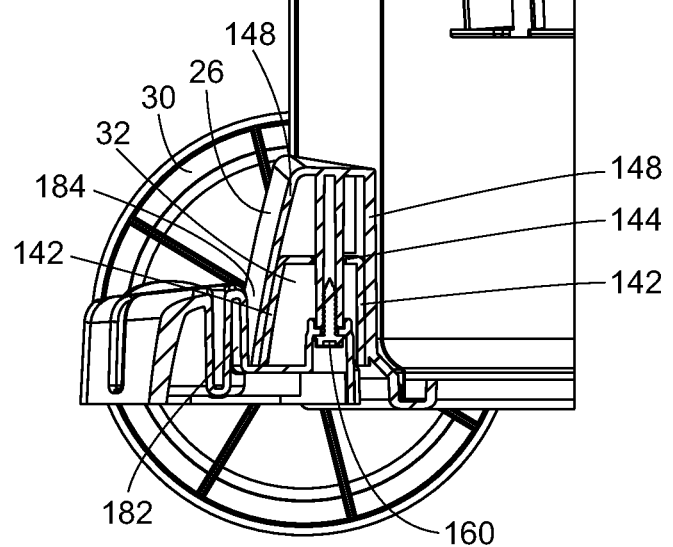

As best seen in FIG. 5, the optional accessory component 34 on the illustrated vacuum cleaner 20 has slots 180 that can be used to hold nozzles, hoses, or the like. The illustrated accessory component is made of molded plastic and mounts to a lower edge of the dolly 26. As seen in FIGS. 7, 8, and 10, it has molded upright walls 182 that define a slot 183 that engages a corresponding wall 184 on the underside of the dolly. Lateral slots 186 can be provided to accommodate lateral ribs 187 on the dolly.

In the illustrated arrangement, the accessory component 34 functionally interacts with the axle mounts 32. As seen in FIG. 7, the accessory component has fastener surfaces 190 that align with the screw bosses 149 on the dolly 26 that project into the openings 150 on the axle mounts 32. Fasteners 160 extend through holes 196 in the fastener surfaces into the screw bosses. The heads of the fasteners seat against the fastener surfaces, trapping the axle mounts between accessory component and the dolly. As used here, the term "seats" against includes arrangements in which a washer or comparable structure is positioned between the head of the fastener and the fastener surface.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A portable cleaner that has:
   a dolly that has an underside;
   a first caster socket that is arranged generally vertically, is positioned in a first boss near the perimeter of the dolly, holds and retains a caster that has a stem, and is accessible from the underside of the dolly;
   at least one unused caster socket that is positioned in a second boss near the perimeter of the dolly, at the same elevation as the first caster socket, and is adapted to hold and retain the caster stem;
   at least one axle mount that encloses the second boss, mounts to the dolly, and has a generally horizontal axle hub; and
   a wheel that is mounted on the axle hub and supports the cleaner for movement across a floor.

2. A portable cleaner as recited in claim 1, in which:
   the axle mount is made of molded plastic, has a sleeve that receives the second boss on the underside of the dolly, and is secured to the dolly by a fastener that is accessible only from the underside of the dolly.

3. A portable cleaner as recited in claim 1, in which the portable cleaner has:
   a sleeve on the axle mount that receives the second boss on the underside of the dolly; and
   upright walls that extend outwardly from near the sleeve in a direction away from the axle hub, engage corresponding walls on the underside of the dolly, and support the axle mount against the dolly.

4. A portable cleaner as recited in claim 1, that also has:
   a first spaced support that is integrally formed with the axle mount;
   upright walls on the spaced support that extend outwardly from near the sleeve in a direction away from the axle hub, engage corresponding walls on the underside of the dolly, and support the axle mount against the dolly;
   a second spaced support that is integrally mounted on the axle mount; and
   upright walls on each second support that extend outwardly from near the sleeve in a direction away from the axle hub and the first spaced support, engage corresponding walls on the underside of the dolly, and support the axle mount against the dolly.

5. A portable cleaner as recited in claim 1, in which the portable cleaner:
   has a swivel caster that is mounted in the first caster socket and supports the vacuum cleaner for movement across a floor.

6. A portable cleaner as recited in claim 1, in which the portable cleaner:
   has a third caster socket that is positioned in a third boss near the perimeter of the dolly, at the same elevation as the first caster socket, is adapted to hold and retain the caster stem, and is accessible from the underside of the dolly;
   has a second axle mount that engages the third boss, mounts to the dolly, and has an axle hub that is collinear with the axel hub on the other axle mount; and
   has wheels that are mounted on each of the axle hubs and support the cleaner for movement across a floor.

7. A portable cleaner as recited in claim 1, in which the portable cleaner:
   also has a swivel caster that is mounted in the first castor socket and supports the vacuum cleaner for movement across a floor;
   has at least one axle mount that engages the boss of the unused caster socket, and mounts to the dolly; and
   has a wheel that is mounted on the axle mount and supports the cleaner for movement across a floor.

8. A portable cleaner as recited in claim 1, in which the portable cleaner:
   has at least two axle mounts that engage the bosses and mount to the dolly; and
   has wheels that are mounted on the axle mounts and support the cleaner for movement across a floor.

9. A portable cleaner as recited in claim 1, in which the portable cleaner:
   has at least two axle mounts that engage the bosses, mount to the dolly, and have a generally horizontal axle hub;
   has wheels that are mounted on each of the axle hubs and support the cleaner for movement across a floor;
   also has an accessory component that has molded upright walls that engage corresponding walls on the underside of the dolly and has one fastener surface that aligns with an opening on one of the axle mounts and another fastener surface that aligns with an opening on the other of the axle mounts; and
   also has one fastener that seats against one of the fastener surfaces and extends through a hole in that fastener surface and into the dolly, and another fastener that seats against the other fastener surface and extends through a hole in that fastener surface and into the dolly.

10. A portable cleaner that has:
    the dolly has an underside and four outer corners;
    four caster sockets are arranged generally vertically, are positioned at each outer corner of the dolly in bosses near the perimeter of the dolly, and are accessible from the underside of the dolly;
    swivel casters are mounted in two of the caster sockets on one side of the dolly and support the cleaner for movement across a floor;
    two molded axle mounts that each have a sleeve that receives one of the bosses on the other side of the dolly, are secured to the dolly by fasteners that are accessible only from the underside of the dolly, and have collinear horizontal axle hubs;

a first spaced support that is integrally molded on each axle mount;

upright walls on each spaced support that extend outwardly from near the sleeve in a direction away from the axle hub, engage corresponding walls on the underside of the dolly, and support the axle mount against the dolly; and wheels that are mounted on the axle hubs and support the cleaner for movement across a floor.

11. A portable vacuum cleaner that has:

a dolly that has an underside and four outer corners;

at least four caster sockets that are arranged generally vertically, are positioned at each outer corner of the dolly in bosses near the perimeter of the dolly, and are accessible from the underside of the dolly;

swivel casters that are mounted in two of the caster sockets on one side of the dolly and support the vacuum cleaner for movement across a floor;

two molded axle mounts that each have a sleeve that receives one of the bosses on the other side of the dolly, are secured to the dolly by fasteners that are accessible only from the underside of the dolly, and have co-linear horizontal axle hubs;

a first spaced support that is integrally molded on each axle mount;

upright walls on each spaced support that extend outwardly from near the sleeve in a direction away from the axle hub, engage corresponding walls on the underside of the dolly, and support the axle mount against the dolly;

a second spaced support that is integrally mounted on each axle mount;

upright walls on each second support that extend outwardly from near the sleeve in a direction away from the axle hub and the first spaced support, engage corresponding walls on the underside of the dolly, and support the axle mount against the dolly;

an accessory component that has molded upright walls that engage corresponding walls on the underside of the dolly and has one fastener surface that aligns with an opening on one of the axle mounts and another fastener surface that aligns with an opening on the other of the axle mounts;

one fastener that seats against one of the fastener surfaces in the accessory component and extends through a hole in that fastener surface and into the dolly, and another fastener that seats against the other fastener surface and extends through a hole in the other of the fastener surface and into the dolly; and wheels that are mounted on the axle hubs and support the vacuum cleaner for movement across a floor.

* * * * *